US012792516B2

(12) United States Patent
Nicholson et al.

(10) Patent No.: US 12,792,516 B2
(45) Date of Patent: Nov. 10, 2026

(54) COHERENCY POINT MOVE FOR LINK DOWN

(71) Applicant: International Business Machines Corporation, Armonk, NY (US)

(72) Inventors: Hailey Nicholson, New York, NY (US); Jie Zheng, Poughkeepsie, NY (US); Ekaterina M. Ambroladze, Ridgefield, CT (US); Vesselina Papazova, Highland, NY (US); Eberhard Engler, Tübingen (DE); Kyle Phillips, Poughkeepsie, NY (US); Nolan Holmes, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 27 days.

(21) Appl. No.: 19/092,338

(22) Filed: Mar. 27, 2025

(65) Prior Publication Data

US 2026/0300179 A1 Oct. 1, 2026

(51) Int. Cl.
*G06F 12/0831* (2016.01)
*G06F 12/0837* (2016.01)

(52) U.S. Cl.
CPC ...... *G06F 12/0831* (2013.01); *G06F 12/0837* (2013.01)

(58) Field of Classification Search
CPC ......................... G06F 12/0831; G06F 12/0837
See application file for complete search history.

(56) References Cited

U.S. PATENT DOCUMENTS

| | | | | |
|---|---|---|---|---|
| 10,223,161 | B2 | 3/2019 | Krithivas et al. | |
| 12,299,455 | B1 * | 5/2025 | Teng | G06F 9/3891 |
| 2013/0042034 | A1 * | 2/2013 | Mannava | G06F 9/522 710/61 |
| 2020/0320029 | A1 | 10/2020 | Berke et al. | |
| 2021/0064234 | A1 | 3/2021 | Zhang et al. | |

OTHER PUBLICATIONS

Authors et. al.: Disclosed Without Attribution, IP.com No. IPCOM000240794D, "A Method and System for Optimal Routing of Input/Output Data for Business Intelligence Queries", Mar. 3, 2015, 4 pages.
Authors et. al.: Disclosed Without Attribution, IP.com No. IPCOM000250005D, "P9NEST,—FB06—Method of Managing Coherency in a 3-Hop Topology", May 15, 2017, 7 pages.
Authors et. al.: Disclosed Without Attribution, IP.com No. IPCOM000263551D, "Mesh restoration prioritization based on spectral efficiency of coherent modem lines", Sep. 10, 2020, 11 pages.

(Continued)

*Primary Examiner* — Jason W Blust
(74) *Attorney, Agent, or Firm* — Harrity & Harrity, LLP

(57) ABSTRACT

In some implementations, a computer system may quiet a computer system configured for symmetric multiprocessing by blocking traffic that is not associated with a link down protocol for bringing down a link. The computer system may move a coherency point from a first chip associated with the link to a second chip associated with an alternative link. The computer system may unquiet the computer system to allow the traffic to resume.

20 Claims, 9 Drawing Sheets

(56) References Cited

OTHER PUBLICATIONS

Bolotin et al., "The Power of Priority: NoC based Distributed Cache Coherency", First International Symposium on Networks-on-Chip (NOCS'07), Dec. 2006, 10 pages.
Caheny et al., "Reducing Cache Coherence Traffic with a NUMA-Aware Runtime Approach", IEEE Transactions on Parallel and Distributed Systems, Sep. 2016, 14 pages.
Cantin et al., "Dynamic Verification of Cache Coherence Protocols", High Performance Memory Systems, May 2001, 11 pages.
Ramos et al., "Modeling Communication in Cache-Coherent SMP Systems—A Case-Study with Xeon Phi", 22nd Intl. ACM Symp. on High Performance Parallel and Distributed Computing (HPDC'13), Jun. 2013, 12 pages.

* cited by examiner

200

COHERENCY POINT MOVE FOR LINK DOWN

BACKGROUND

This disclosure relates to circuit systems, and more specifically, to a coherency point for a processing system.

SUMMARY

Some aspects described herein relate to a method. The method may comprise quieting a computer system configured for symmetric multiprocessing by blocking traffic that is not associated with a link down protocol. The method may comprise moving a coherency point from a first chip associated with a link to a second chip associated with an alternative link based on the command. The method may comprise unquieting the computer system to allow the traffic to resume.

Some aspects described herein relate to a computer system. The computer system may include a processor set, one or more computer-readable storage media, and program instructions stored on the one or more computer-readable storage media to cause the processor set to perform operations. The operations may include dynamically changing a coherency protocol and routing in the computer system to enter a link down mode. The operations may include temporarily quieting the computer system to stop commands coming into or out of a chip or unit associated with a first link. The operations may include moving a coherency point associated with the first link to an alternative link without breaking coherency. The operations may include changing inter-node bus valid signals and inter-node routing. Note that drawer and node can be used interchangeably. The operations may include resuming full capacity and functionality in the link down mode.

Some aspects described herein relate to a computer program product. The computer program product may include one or more computer-readable storage media and program instructions stored on the one or more computer-readable storage media to perform operations. The operations may include causing a distributed computer system to transition from a normal mode to a link down mode, where the distributed computer system comprises multiple links. The operations may include moving a coherency point associated with a link that requires repair to an alternative link without breaking coherency. The operations may include reconfiguring the distributed computer system to route traffic over the alternative link. The operations may include operating the distributed computer system in the link down mode.

DETAILED DESCRIPTION

The following detailed description of example implementations refers to the accompanying drawings. The same reference numbers in different drawings may identify the same or similar elements.

Inter-drawer cables ("A-Bus") in mainframe systems are used to maximize throughput and fairness. However, when a cable becomes degraded, the system typically needs to bring down the entire link and reconfigure the link registers as well as coherency-related registers to reroute all traffic to a different link while maintaining coherency. Existing methods of re-routing traffic, such as cross-routing, may not be possible due to the use of different connectors, and static transfers would require unacceptable downtime.

Existing methods of cable repair may require the removal of a whole drawer, resulting in significant performance and capacity impact. Therefore, there is a need for a method to minimize performance and capacity impact while maintaining system coherency. Maintaining system coherency is critical, as it prevents invalid or wrong values from being accessed, and ensures data integrity.

Some implementations described herein provide a computer system for dynamically transitioning a distributed system from a multi-link to a reduced-link mode (one link taken off-line to be repaired and leave the remaining links active) while maintaining system coherency. For example, the computer system may quiet a computer system (block traffic), move the coherency point from a first chip associated with a link to a second chip associated with an alternative link, and unquiet the computer system to allow traffic to resume.

The computer system may also reconfigure the computer system to change from a multi-link routing protocol to a reduced-link routing protocol, maintain the computer system in the reduced-link routing protocol mode without losing functionality, and move the coherency point back to the first chip in association with a repair of the link.

In this way, the system reduces latency and packet loss during link transition, maintains cache coherence across the distributed system, and preserves system availability. Thus, the computer system conserves processing resources, memory resources, network resources, and/or the like by avoiding manual intervention, reducing system downtime, and minimizing the need for redundant data transmissions. Additionally, the dynamic transition to and from link-down mode prevents data corruption, maintains network stability, and ensures consistent system behavior, even in the presence of degraded links.

Figure 1:
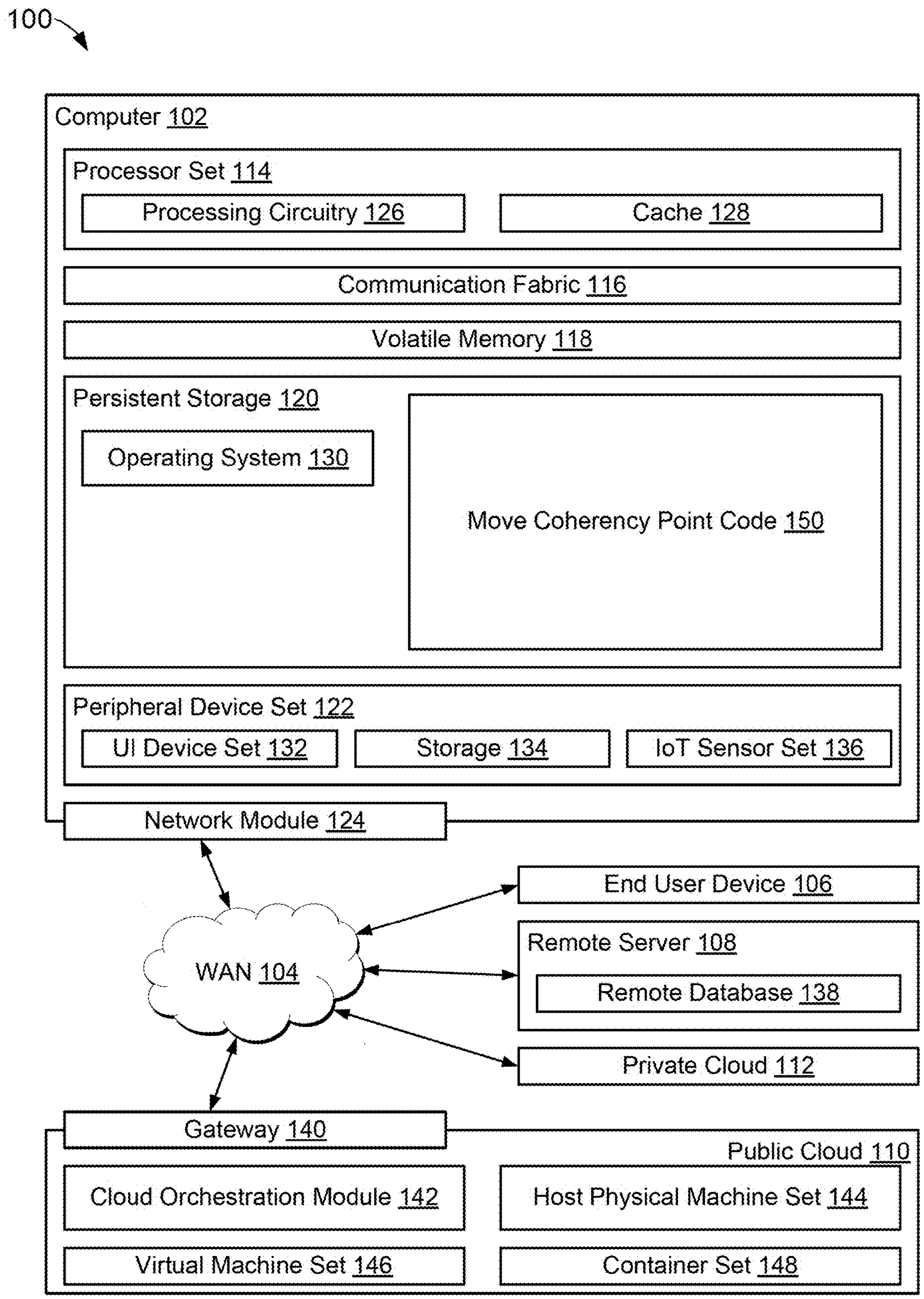
FIG. 1 is a diagram of an example computing environment for moving a coherency point for a link down mode as described herein.

FIG. 1 is a diagram of an example computing environment 100 for moving a coherency point for a link down mode as described herein.

Computing environment 100 contains an example of an environment for the execution of at least some of the computer code involved in performing the inventive methods, such as move coherency point code 150. In addition to move coherency point code 150, computing environment 100 includes, for example, computer 102, wide area network (WAN) 104, end user device (EUD) 106, remote server 108, public cloud 110, and private cloud 112. In this embodiment, computer 102 includes processor set 114 (including processing circuitry 126 and cache 128), communication fabric 116, volatile memory 118, persistent storage 120 (including operating system 130 and move coherency point code 150, as identified above), peripheral device set 122 (including user interface (UI) device set 132, storage 134, and Internet of Things (IoT) sensor set 136), and network module 124. Remote server 108 includes remote database 138. Public cloud 110 includes gateway 140, cloud orchestration module 142, host physical machine set 144, virtual machine set 146, and container set 148.

Computer 102 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network, or querying a database, such as remote database 138. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 102, to keep the presentation as simple as possible. Computer 102 may be located in a cloud, even though it is not shown in a cloud in FIG. 1. On the other hand, computer 102 is not required to be in a cloud except to any extent as may be affirmatively indicated.

Processor set 114 includes one, or more, computer processors of any type now known or to be developed in the future. Processing circuitry 126 may be distributed over multiple packages (for example, multiple, coordinated integrated circuit chips). Processing circuitry 126 may implement multiple processor threads and/or multiple processor cores. Cache 128 is memory that is located in the processor chip package(s) and is typically used for data or code that should be available for rapid access by the threads or cores running on processor set 114. Cache memories are typically organized into multiple levels depending upon relative proximity to the processing circuitry. Alternatively, some, or all, of the cache for the processor set may be located "off chip." In some computing environments, processor set 114 may be designed for working with qubits and performing quantum computing.

Computer-readable program instructions are typically loaded onto computer 102 to cause a series of operational steps to be performed by processor set 114 of computer 102 and thereby effect a computer-implemented method, such that the instructions thus executed will instantiate the methods specified in flowcharts and/or narrative descriptions of computer-implemented methods included in this document (collectively referred to as "the inventive methods"). These computer-readable program instructions are stored in various types of computer-readable storage media, such as cache 128 and the other storage media discussed below. The program instructions, and associated data, are accessed by processor set 114 to control and direct performance of the inventive methods. In computing environment 100, at least some of the instructions for performing the inventive methods may be stored in move coherency point code 150 in persistent storage 120.

Communication fabric 116 is the signal conduction path that allows the various components of computer 102 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

Volatile memory 118 is any type of volatile memory now known or to be developed in the future. Examples include dynamic type random access memory (RAM) or static type RAM. Typically, volatile memory 118 is characterized by random access, but this is not required unless affirmatively indicated. In computer 102, the volatile memory 118 is located in a single package and is internal to computer 102, but, alternatively or additionally, the volatile memory may be distributed over multiple packages and/or located externally with respect to computer 102.

Persistent storage 120 is any form of non-volatile storage for computers that is now known or to be developed in the future. The non-volatility of this storage means that the stored data is maintained regardless of whether power is being supplied to computer 102 and/or directly to persistent storage 120. Persistent storage 120 may be a read only memory (ROM), but typically at least a portion of the persistent storage allows writing of data, deletion of data, and re-writing of data. Some familiar forms of persistent storage include magnetic disks and solid-state storage devices. Operating system 130 may take any of several forms, such as various known proprietary operating systems or open source Portable Operating System Interface-type operating systems that employ a kernel.

Figure 4A:
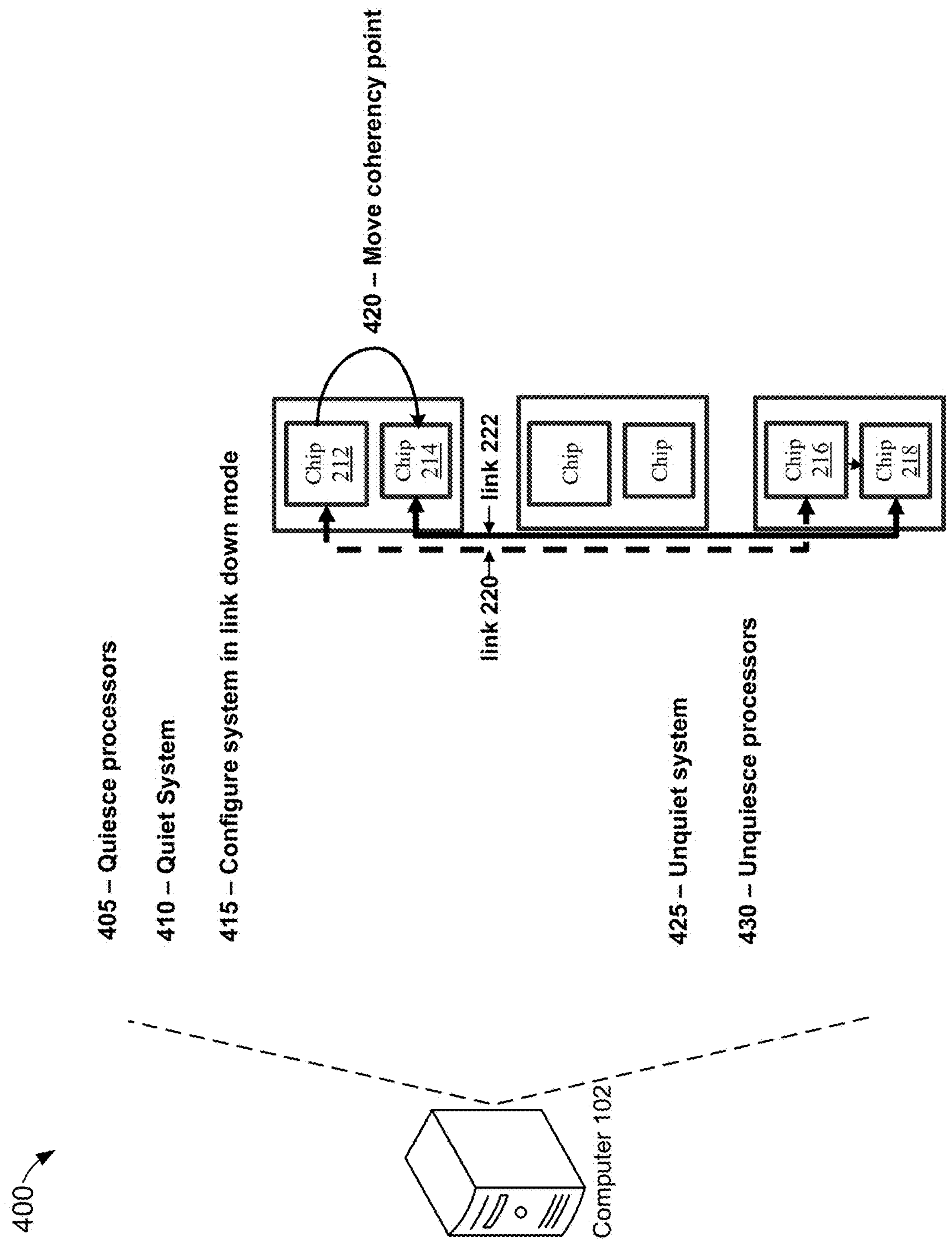
FIGS. 4A-4C illustrate an example implementation for moving a coherency point for a link down mode.
Figure 4B:
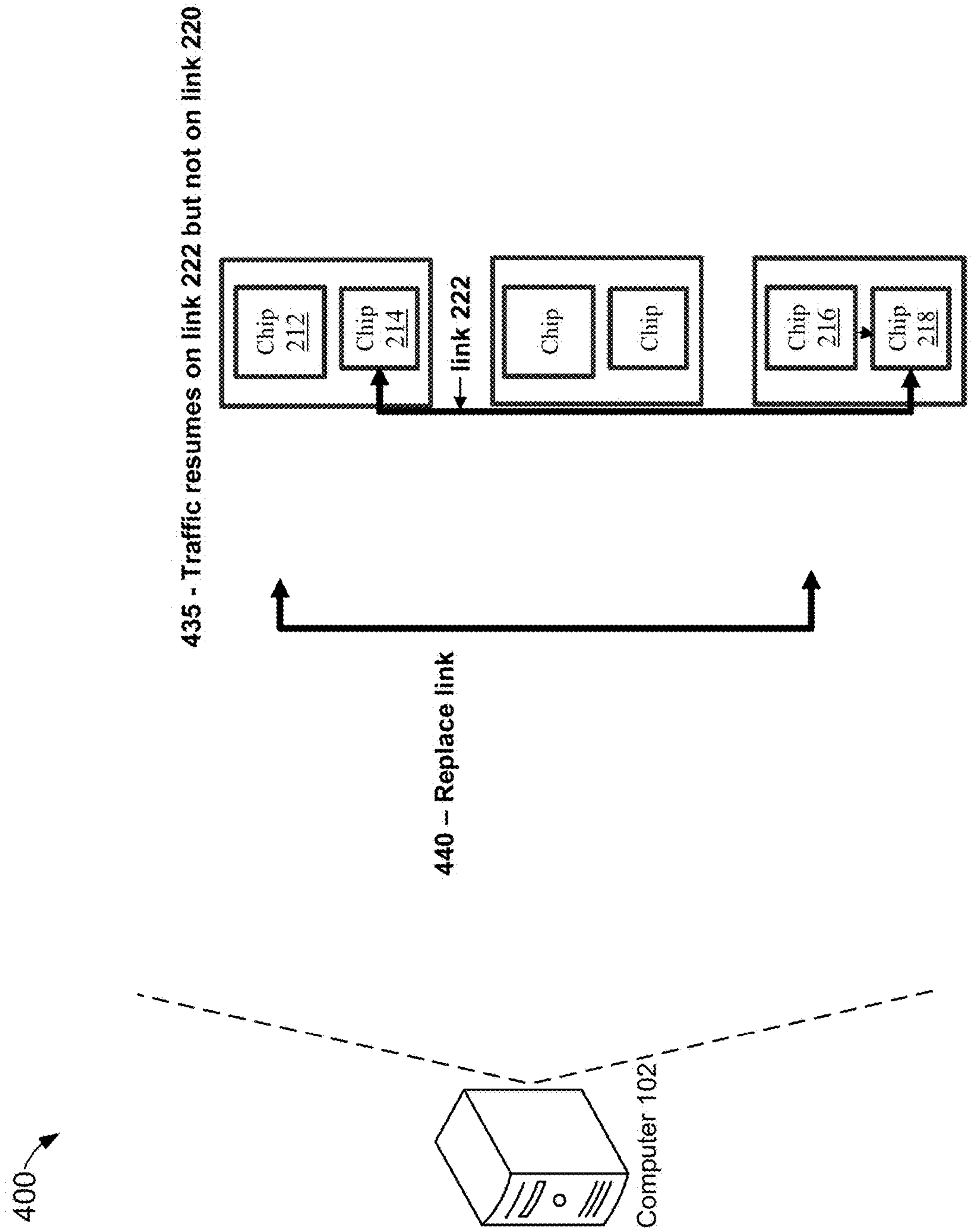
Figure 4C:
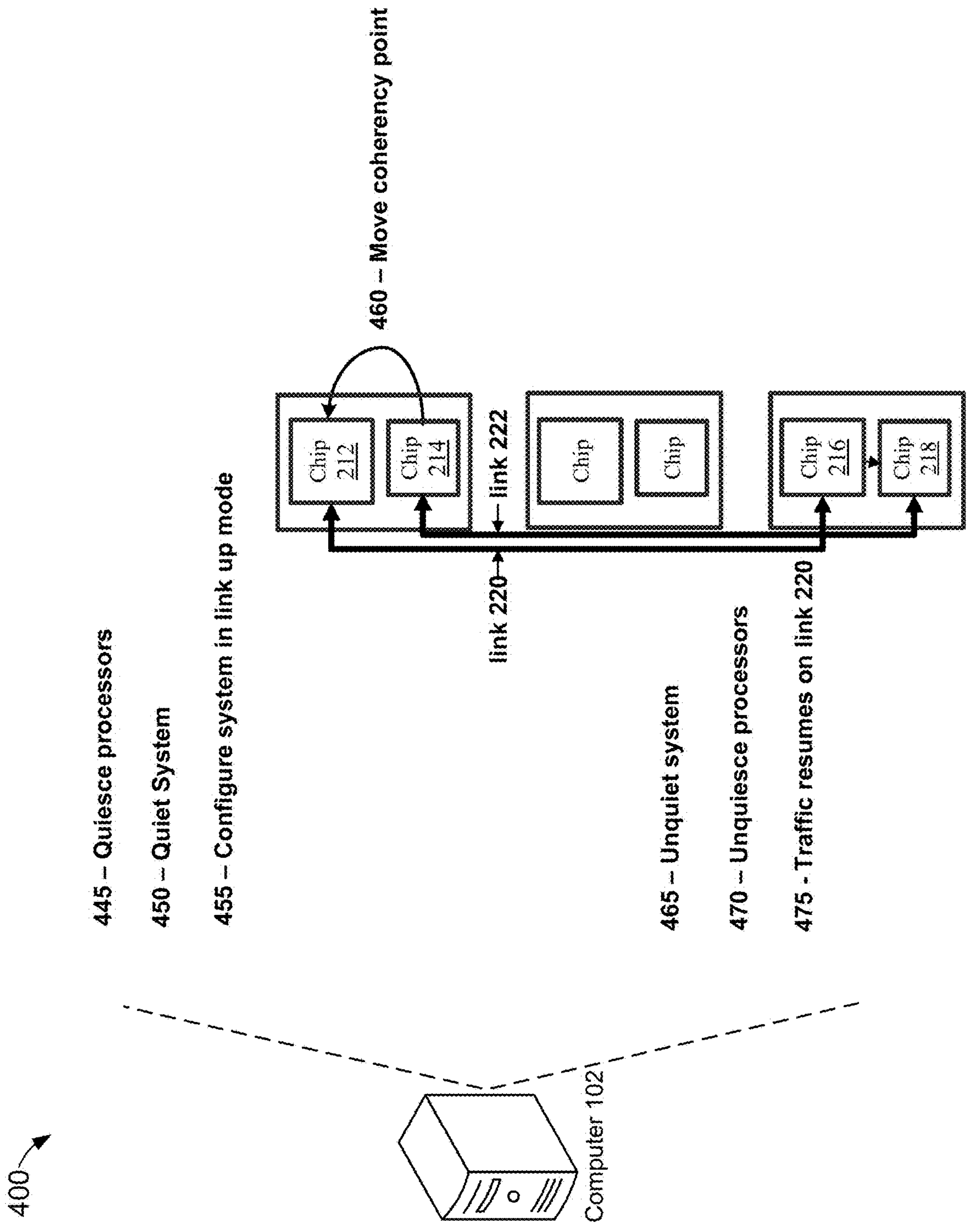
Figure 5:
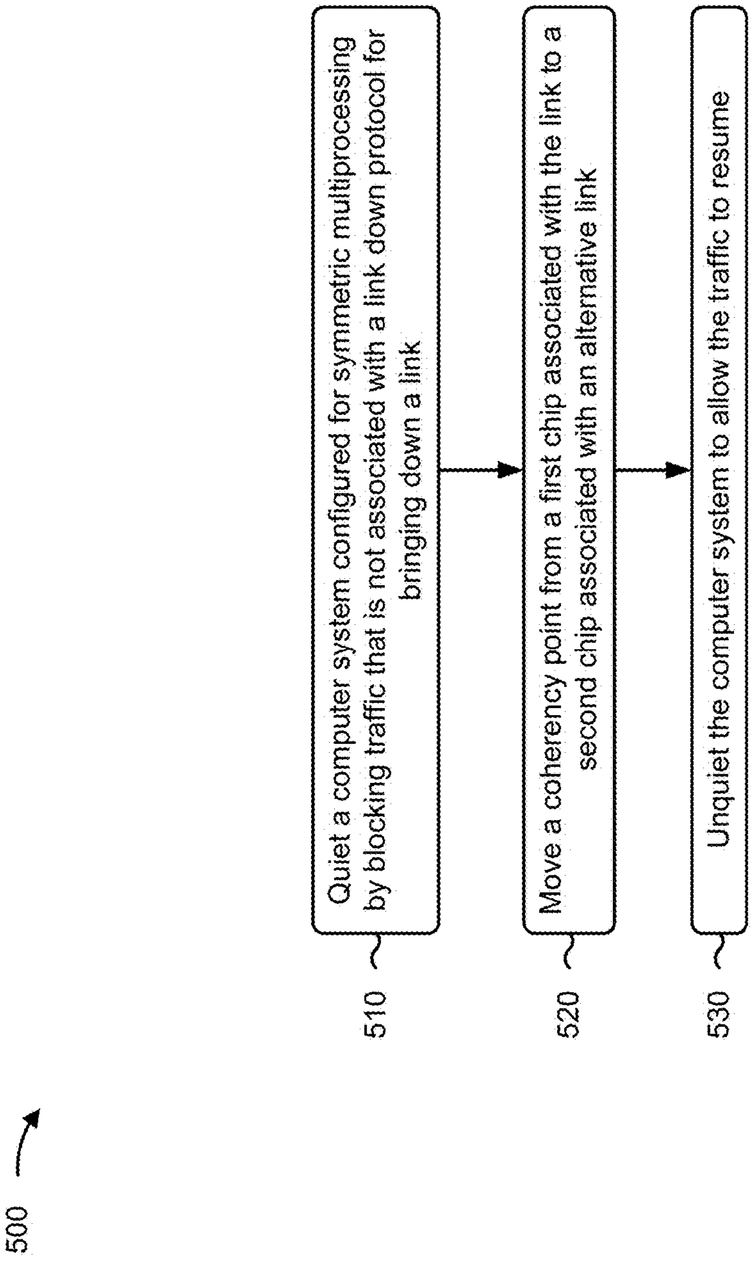
FIG. 5 is a flowchart of an example process associated with moving a coherency point for a link down mode.
Figure 6:
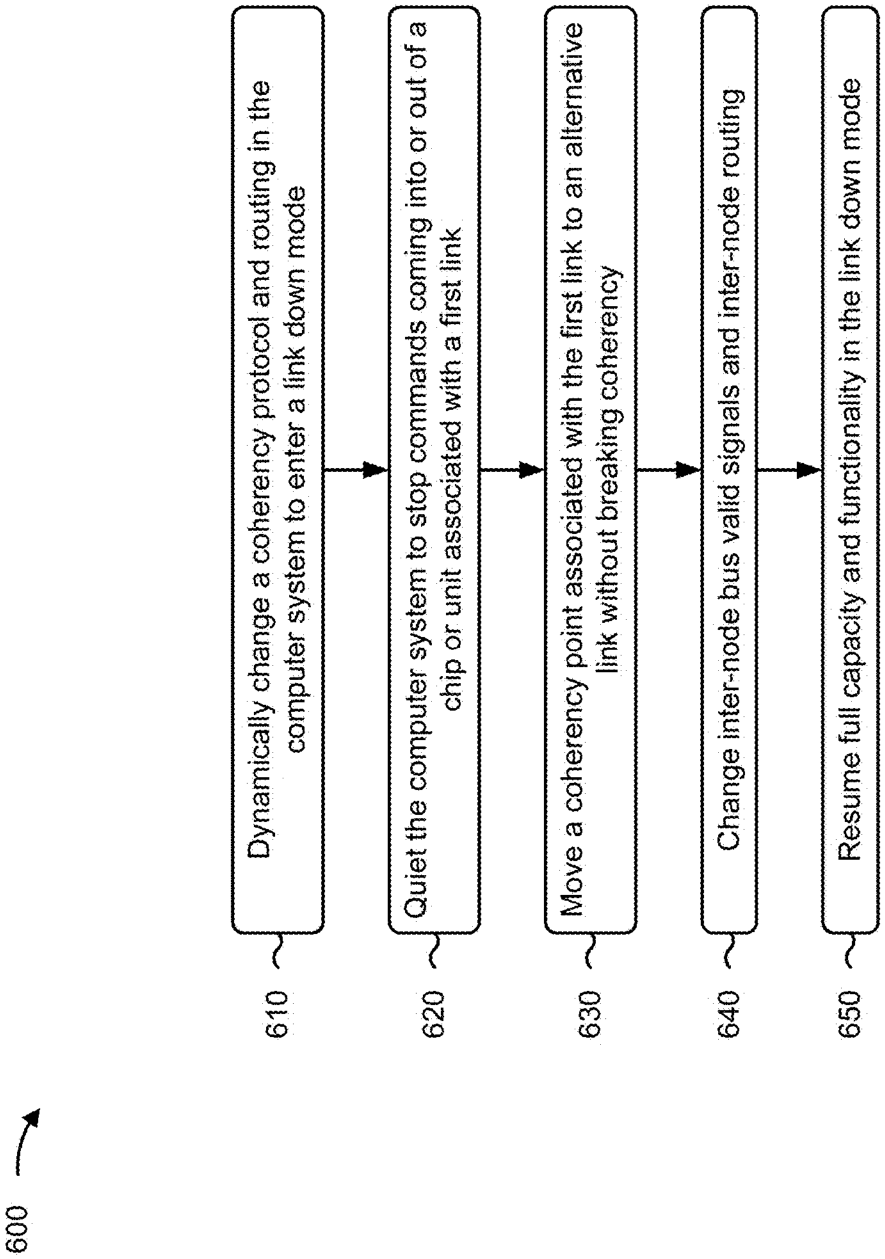
FIG. 6 is a flowchart of an example process associated with moving a coherency point for a link down mode.

The code included in the move coherency point code 150 typically includes at least some of the computer code involved in performing one or more operations described herein, such as the operations of implementation 300 in FIGS. 3A-3C and the processes described in FIGS. 4-6.

Peripheral device set 122 includes the set of peripheral devices of computer 102. Data communication connections between the peripheral devices and the other components of computer 102 may be implemented in various ways, such as Bluetooth® connections, Near-Field Communication (NFC) connections, connections made by cables (such as universal serial bus (USB) type cables), insertion-type connections (for example, secure digital (SD) card), connections made through local area communication networks and/or connections made through wide area networks such as the internet. In various embodiments, UI device set 132 may include components such as a display screen, speaker, microphone, wearable devices (such as goggles and smart watches), keyboard, mouse, printer, touchpad, game controllers, and/or haptic devices. Storage 134 is external storage, such as an external hard drive, or insertable storage, such as an SD card. Storage 134 may be persistent and/or volatile. In some embodiments, storage 134 may take the form of a quantum computing storage device for storing data in the form of qubits. In embodiments where computer 102 is required to have a large amount of storage (for example, where computer 102 locally stores and manages a large database), this storage may be provided by peripheral storage devices designed for storing very large amounts of data, such as a storage area network (SAN) that is shared by multiple, geographically distributed computers. IoT sensor set 136 is made up of sensors that can be used in Internet of Things applications. For example, one sensor may be a thermometer and another sensor may be a motion detector.

Network module 124 is the collection of computer software, hardware, and firmware that allows computer 102 to communicate with other computers through WAN 104. Network module 124 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 124 are performed on the same physical hardware device. In other embodiments (for example, embodiments that utilize software-defined networking (SDN)), the control functions and the forwarding functions of network module 124 are performed on physically separate devices, such that the control functions manage several different network hardware devices. Computer-readable program instructions for performing the inventive methods can typically be downloaded to computer 102 from an external computer or external storage device through a network adapter card or network interface included in network module 124.

WAN 104 is any wide area network (for example, the internet) capable of communicating computer data over non-local distances by any technology for communicating computer data, now known or to be developed in the future. In some embodiments, the WAN 104 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and/or edge servers.

EUD 106 is any computer system that is used and controlled by an end user (for example, a customer of an enterprise that operates computer 102), and may take any of the forms discussed above in connection with computer 102. EUD 106 typically receives helpful and useful data from the operations of computer 102. For example, in a hypothetical case where computer 102 is designed to provide a recommendation to an end user, this recommendation would typically be communicated from network module 124 of computer 102 through WAN 104 to EUD 106. In this way, EUD 106 can display, or otherwise present, the recommendation to an end user. In some embodiments, EUD 106 may be a client device, such as thin client, heavy client, mainframe computer, desktop computer and so on.

Remote server 108 is any computer system that serves at least some data and/or functionality to computer 102. Remote server 108 may be controlled and used by the same entity that operates computer 102. Remote server 108 represents the machine(s) that collect and store helpful and useful data for use by other computers, such as computer 102. For example, in a hypothetical case where computer 102 is designed and programmed to provide a recommendation based on historical data, this historical data may be provided to computer 102 from remote database 138 of remote server 108.

Public cloud 110 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 110 is performed by the computer hardware and/or software of cloud orchestration module 142. The computing resources provided by public cloud 110 are typically implemented by virtual computing environments that run on various computers making up the computers of host physical machine set 144, which is the universe of physical computers in and/or available to public cloud 110. The virtual computing environments (VCEs) typically take the form of virtual machines from virtual machine set 146 and/or containers from container set 148. These VCEs may be stored as images and may be transferred among and between the various physical machine hosts, either as images or after instantiation of the VCE. Cloud orchestration module 142 manages the transfer and storage of images, deploys new instantiations of VCEs, and manages active instantiations of VCE deployments. Gateway 140 is the collection of computer software, hardware, and firmware that allows public cloud 110 to communicate through WAN 104.

Some further explanation of VCEs will now be provided. VCEs can be stored as "images." A new active instance of a VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 112 is similar to public cloud 110, except that the computing resources are only available for use by a single enterprise. While private cloud 112 is depicted as being in communication with WAN 104, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this example, public cloud 110 and private cloud 112 are both part of a larger hybrid cloud.

Cloud computing services and/or microservices (not separately shown in FIG. 1): private and public clouds 110 are programmed and configured to deliver cloud computing services and/or microservices (unless otherwise indicated, the word "microservices" shall be interpreted as inclusive of larger "services" regardless of size). Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some embodiments, cloud services may be configured and orchestrated according to an "as a service" technology paradigm where content is being presented to an internal or external customer in the form of a cloud computing service. As-a-service offerings typically provide endpoints with which various customers interface. These endpoints are typically based on a set of application programming interfaces (APIs). One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with such tasks. Another category is Software-as-a-Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

In some implementations, a device (e.g., computer 102, computer system) may quiet a computer system configured for symmetric multiprocessing by blocking traffic that is not associated with a link down protocol for bringing down a link; move a coherency point from a first chip associated with the link to a second chip associated with an alternative link based on the command; and unquiet the computer system to allow the traffic to resume.

In some implementations, a device may dynamically change a coherency protocol and routing in the computer system to enter a link down mode; temporarily quiet the computer system to stop commands coming into or out of a chip or unit associated with a first link; move a coherency point associated with the first link to an alternative link without breaking coherency; change inter-node bus valid signals and inter-node routing; and resume full capacity and functionality in the link down mode.

In some implementations, a device may cause a distributed computer system to transition from a normal mode to a link down mode, where the distributed computer system comprises multiple links between two sets of chips. The device may move a coherency point associated with a link that requires repair to an alternative link without breaking coherency; reconfigure the distributed computer system to route traffic over the alternative link; and operate the distributed computer system in the link down mode.

Figure 2:
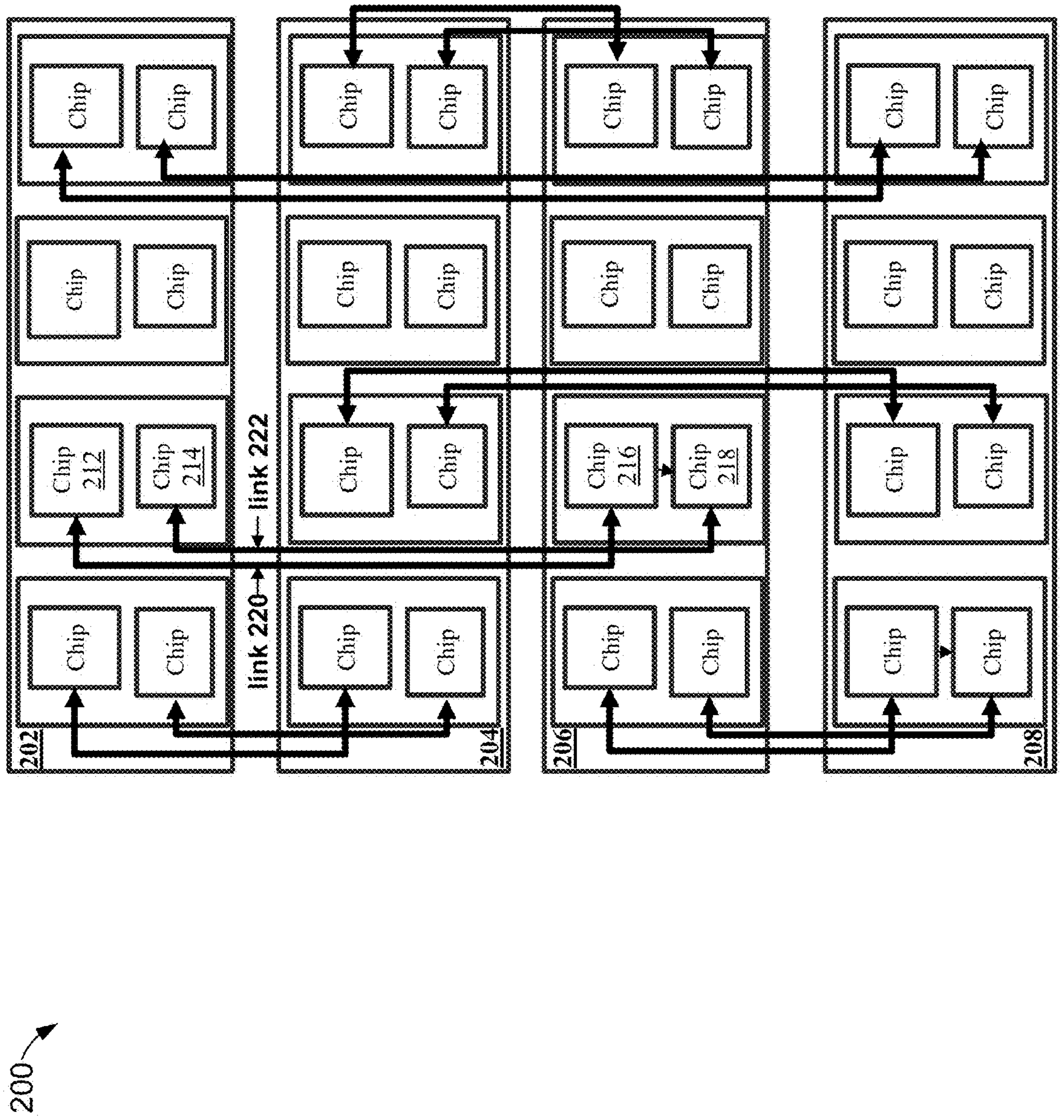
FIG. 2 illustrates a diagram for a symmetrical processing computer system with computer chips on multiple drawers with links between the chips.

FIG. 2 illustrates a diagram for a symmetrical processing computer system 200 with computer chips on multiple drawers 202, 204, 206, and 208 with links between the chips. For example, link 220 is between chip 212 and chip 216. Link 222 is between chip 214 and chip 218.

Figure 3:
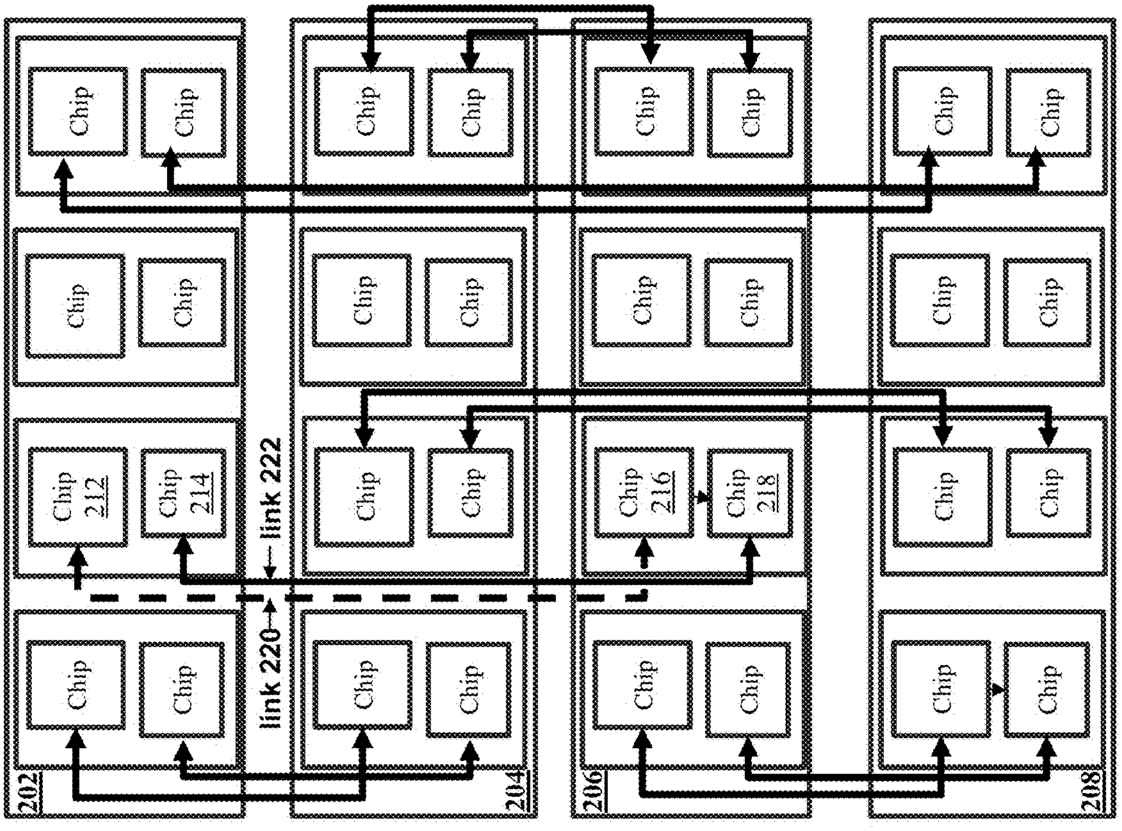
FIG. 3 illustrates a diagram of a failure of link.

FIG. 3 illustrates a diagram of a failure of link 220. As a result, link 220 is to be repaired. Transferring traffic off the link (cable) is necessary for the link or cable to be repaired while having an active system. Some solutions for handling traffic during a cable repair have disadvantages. Such solutions include cross-routing (not possible with the on-module connector), temporary removal of a drawer (causes significant performance and capacity impact), and static transfer (unacceptable downtime).

FIGS. 4A-4C illustrate an example implementation 400 for moving a coherency point for a link down mode. In some implementations, a computer system (e.g., computer 102) may move a coherency point for a link to another location (e.g., chip of another link). A coherency point is a location within a system where the coherency protocol is maintained. In other words, the coherency point is a point where the system ensures that all accesses to a particular resource, such as a memory location or an I/O device, are coherent and consistent with each other.

In the context of a multi-processor system, "coherency point" may include a unit, a chip or logic that determines the access order in which a requester obtains access to a memory or cache line, in the case of address contention. The coherency point may indicate the coherency level for that access-read-only, shared, or exclusive ownership of the line. The coherency point may also manage resources associated with an interface and prioritize which requester can use those resources to request ownership of a line. At this point, the coherency protocol ensures that all accesses to the shared resource are properly synchronized and that the resource is not modified by multiple processors simultaneously.

In the context of a link down mode, the computer system may move the coherency point from one chip to another chip. This means that the responsibility for maintaining coherency is transferred from one chip to another (new) chip. The new chip becomes the new coherency point and is responsible for maintaining coherency for the shared resource. The coherency point may help maintain the coherence and consistency of shared resources in a multi-processor system. The coherency point ensures that the system operates correctly and that data is not corrupted or lost due to simultaneous access by multiple processors. Moving the coherency point helps the system to operate correctly while a link is down. As a result, processing resources are conserved.

As shown by reference number 405 in FIG. 4A, a computer system (e.g., computer 102) may quiet (quiesce) the processors of the system in response to a determination that link 220 has failed and will be replaced. Note that quiet and quiesce may be used interchangeably. As shown by reference number 410, the system may quiet the system in preparation for a link down mode. The quieting of the system may include blocking all traffic that is not associated with a link down protocol. The link down protocol may operate to bring a link down. The link down protocol may include a link down sequence (a sequence of one or more commands for bringing the link down). This may include blocking all traffic that is not a command that moves a coherency point from a first chip associated with a link to a second chip associated with an alternative link. For example, the system may use a quieting signal to notify all nodes in the system that a link is down and that commands should not be sent to the affected node. The firmware may see a signal that a link needs to come down (i.e., link is damaged but not yet fully broken) and may initiate the link down sequence, beginning with a quiet system command. The system may also use a buffering mechanism to store any commands that are received during the quieting period, so that they can be processed once the system is unquieted.

As shown by reference number 415, the system may configure the system for a link down mode. A link down mode is a state of operation in a system where one or more links between processor chips or other components are shut down or disabled. This can occur when a link fails or is intentionally disabled for maintenance or repair. In a link down mode, the system reconfigures itself to route traffic around the failed or disabled link, ensuring that data is not lost and the system remains operational. This is typically done by moving the coherency point from the disabled or disconnected chip (connected to the degraded link) to another chip (with a link that will remain active), allowing the system to maintain coherency and consistency of shared resources. The link down mode is designed to allow the system to continue operating with minimal disruption, even if one or more links fail or are disabled. This is particularly useful in high-availability systems where downtime is not acceptable.

Once link 220 is down, the system may move the coherency point from chip 212 of link 220 to chip 214 of alternative link 222, as shown by reference number 420. Dynamically transferring the coherency point and routing points may include changing the coherency protocol and routing protocol, depending on the number of links in the system. For example, the system may use a link monitoring mechanism to monitor the number of links in the system, and to notify all nodes in the system of any changes.

The location of the coherency point may be used to initiate system commands and may be converted to run at a single link. This also illustrates the alternate processors that have been identified and aligned with the commands. The system can maintain all layers of commands by sending commands and configuring messages to integrate coherency. Accordingly, technicians can repair the cable with a minimal system performance impact compared to other solutions and has no reduction in system capacity while in the reduced-link mode.

As shown by reference number 425, the system may unquiet the system. As shown by reference number 430, the system may unquiet (unquiesce) the processors. The system may switch connectivity from a multi-link mode to a reduced-link mode. This may include reconfiguring the computer system to change from a multi-link routing protocol to a reduced-link routing protocol by updating the routing tables and protocols used by the system. The system may use a routing update mechanism to notify all nodes in the system of the change in routing protocol, and to update the routing tables to reflect the new protocol.

As shown by reference number 435 of FIG. 4B, traffic is running on link 222 (based on the coherency point and a routing protocol) and not on link 220. As shown by reference number 440, link 220 may be replaced. Once link 220 has been replaced (or repaired) with a new wire or cable, traffic may proceed back to link 220. As shown by reference number 445 of FIG. 4C, the system may quiet (quiesce) the processors. As shown by reference number 450, the system may quiet the system. As shown by reference number 455, the system may configure the system for a link up mode.

As shown by reference number 460, the system may move the coherency point back to chip 212. As shown by reference number 465, the system may unquiet the system. As shown by reference number 470, the system may unquiet (unquiesce) the processors. As shown by reference number 475, the system may resume traffic on link 220.

In some implementations, the command that moves the coherency point uses the original coherency and routing protocol, even after the coherency point has been changed. For example, the system may use a combination of hardware and software components to ensure that the command is executed consistently and predictably, even in the presence of an unstable link. The coherency point may be changed only for a single drawer or a subset of drawers, rather than the entire system. For example, the system may use a drawer isolation mechanism to isolate the affected drawers, and to update the coherency point for only those drawers.

Once the failed or disabled link is repaired or re-enabled, the system can revert back to its original configuration, and the original coherency point can be used again. In some implementations, the system may use a combination of hardware and software components to ensure that the original coherency point can be used again after the link is back up. For example, the system may use a hardware-based mechanism to detect when the failed or disabled link is operational again. The system may use a software-based mechanism to initiate the sequence of steps to reconfigure itself to use the original coherency point. The system may use a combination of hardware and software components to update its routing tables and protocols to reflect the change in coherency point.

The original coherency point can be used again after the link is back up because the system has been designed to maintain coherency and consistency of shared resources, even when the link is unstable and needs to be gated, removed, and replaced. By reverting back to the original coherency point, the system can ensure that data is not lost or corrupted due to the unstable link, the system maintains its original configuration and performance characteristics, and the system can continue to operate with minimal disruption, even in the presence of unstable links.

FIG. 5 is a flowchart of an example process 500 associated with moving a coherency point for a link down mode. One or more process blocks of FIG. 5 are performed by a computer system (e.g., computer 102) and/or by another device or a group of devices separate from or including the computer system. Additionally, or alternatively, one or more process blocks of FIG. 5 may be performed by one or more components of computer 102, such as processor set 114, communication fabric 116, volatile memory 118, and/or move coherency point code 150.

As shown in FIG. 5, process 500 includes quieting a computer system configured for symmetric multiprocessing by blocking traffic that is not associated with a link down protocol for bringing down a link (block 510). For example, the computer system may quiet a computer system configured for symmetric multiprocessing by blocking traffic that is not associated with a link down protocol for bringing down a link, as described above.

As further shown in FIG. 5, process 500 includes moving a coherency point from a first chip associated with the link to a second chip associated with an alternative link based on the command (block 520). For example, the computer system may move a coherency point from a first chip associated with the link to a second chip associated with an alternative link based on the command, as described above.

As further shown in FIG. 5, process 500 includes unquieting the computer system to allow the traffic to resume (block 530). For example, the computer system may unquiet the computer system to allow the traffic to resume, as described above.

Process 500 may include additional aspects, such as any single aspect or any combination of aspects described below and/or in connection with one or more other processes described elsewhere herein.

In a first aspect, process 500 includes reconfiguring the computer system to change from a multi-link routing protocol to a reduced-link routing protocol.

In a second aspect, alone or in combination with the first aspect, process 500 includes maintaining the computer system in the reduced-link routing protocol mode without losing functionality.

In a third aspect, alone or in combination with one or more of the first and second aspects, process 500 includes quieting the computer system, moving the coherency point for the link from the second chip back to the first chip in association with a repair of the link, and unquieting the computer system such that the link is able to carry the traffic.

In a fourth aspect, alone or in combination with one or more of the first through third aspects, process 500 includes reconfiguring the computer system to change to a multi-link routing protocol.

In a fifth aspect, alone or in combination with one or more of the first through fourth aspects, a command issued by the computer system that moves the coherency point uses an original coherency associated with the first chip and an original routing associated with the first chip to complete the command. The off-drawer traffic may be routed to use only the A-Bus that will stay active.

In a sixth aspect, alone or in combination with one or more of the first through fifth aspects, process 500 includes validating information and directing all other processor cores in the computer system to enter spin loops. Process 500 may also include checking a location of a master time-of-day (TOD) clock.

Although FIG. 5 shows example blocks of process 500, in some implementations, process 500 includes additional blocks, fewer blocks, different blocks, or differently arranged blocks than those depicted in FIG. 5. Additionally, or alternatively, two or more of the blocks of process 500 may be performed in parallel.

FIG. 6 is a flowchart of an example process 600 associated with moving a coherency point for a link down mode. One or more process blocks of FIG. 6 are performed by a computer system (e.g., computer 102) and/or by another device or a group of devices separate from or including the computer system. Additionally, or alternatively, one or more process blocks of FIG. 5 may be performed by one or more components of computer 102, such as processor set 114, communication fabric 116, volatile memory 118, and/or move coherency point code 150.

As shown in FIG. 6, process 600 includes dynamically changing a coherency protocol and routing in the computer system to enter a link down mode (block 610). For example, the device may dynamically change a coherency protocol and routing in the computer system to enter a link down mode, as described above. Dynamically changing may include changing while traffic on the computer system is active.

As further shown in FIG. 6, process 600 includes quieting the computer system to stop commands coming into or out of a chip or unit associated with a first link (block 620). For example, the device may quiet the computer system to stop commands coming into or out of a chip or unit associated with a first link, as described above.

As further shown in FIG. 6, process 600 includes moving a coherency point associated with the first link to an alternative link without breaking coherency (block 630). For example, the device may move a coherency point associated with the first link to an alternative link without breaking coherency, as described above.

As further shown in FIG. 6, process 600 includes changing inter-node (or inter-drawer) bus valid signals and inter-node (or inter-drawer) routing (block 640). For example, the device may change inter-node bus valid signals and inter-node routing, as described above.

As further shown in FIG. 6, process 600 includes resuming full capacity and functionality in the link down mode (block 650). For example, the device may resume full capacity and functionality in the link down mode, as described above.

Process 600 may include additional aspects, such as any single aspect or any combination of aspects described below and/or in connection with one or more other processes described elsewhere herein.

In a first aspect, the operations further comprise directing a non-coherent address register to move into the link down mode.

In a second aspect, alone or in combination with the first aspect, the operations further comprise reconfiguring, in association with bringing down the first link, link registers and coherency-related registers to reroute traffic to the alternative link while maintaining coherency.

In a third aspect, alone or in combination with one or more of the first and second aspects, the dynamically changing of the coherency protocol and the routing comprises dynamically changing the coherency protocol and the routing based on a quantity of links in the computer system.

In a fourth aspect, alone or in combination with one or more of the first through third aspects, the changing of the coherency point comprises changing the coherency point for only two nodes connected by the link, without changing the coherency point for other nodes in the computer system.

In a fifth aspect, alone or in combination with one or more of the first through fourth aspects, the operations further comprise issuing a command to dynamically change the coherency protocol and the routing, wherein the command is associated with an original coherency and original routing protocols after the coherency protocol and the routing have changed.

In a sixth aspect, alone or in combination with one or more of the first through fifth aspects, the computer system is a single-drawer system or a multi-drawer system and the coherency point is moved only for drawers affected by the link.

In a seventh aspect, alone or in combination with one or more of the first through sixth aspects, the coherency point is moved from a first chip on a first drawer to a second chip on a second drawer.

In an eighth aspect, alone or in combination with one or more of the first through seventh aspects, the system is a symmetric multiprocessing system.

Although FIG. 6 shows example blocks of process 600, in some implementations, process 600 includes additional blocks, fewer blocks, different blocks, or differently arranged blocks than those depicted in FIG. 6. Additionally, or alternatively, two or more of the blocks of process 600 may be performed in parallel.

Figure 7:
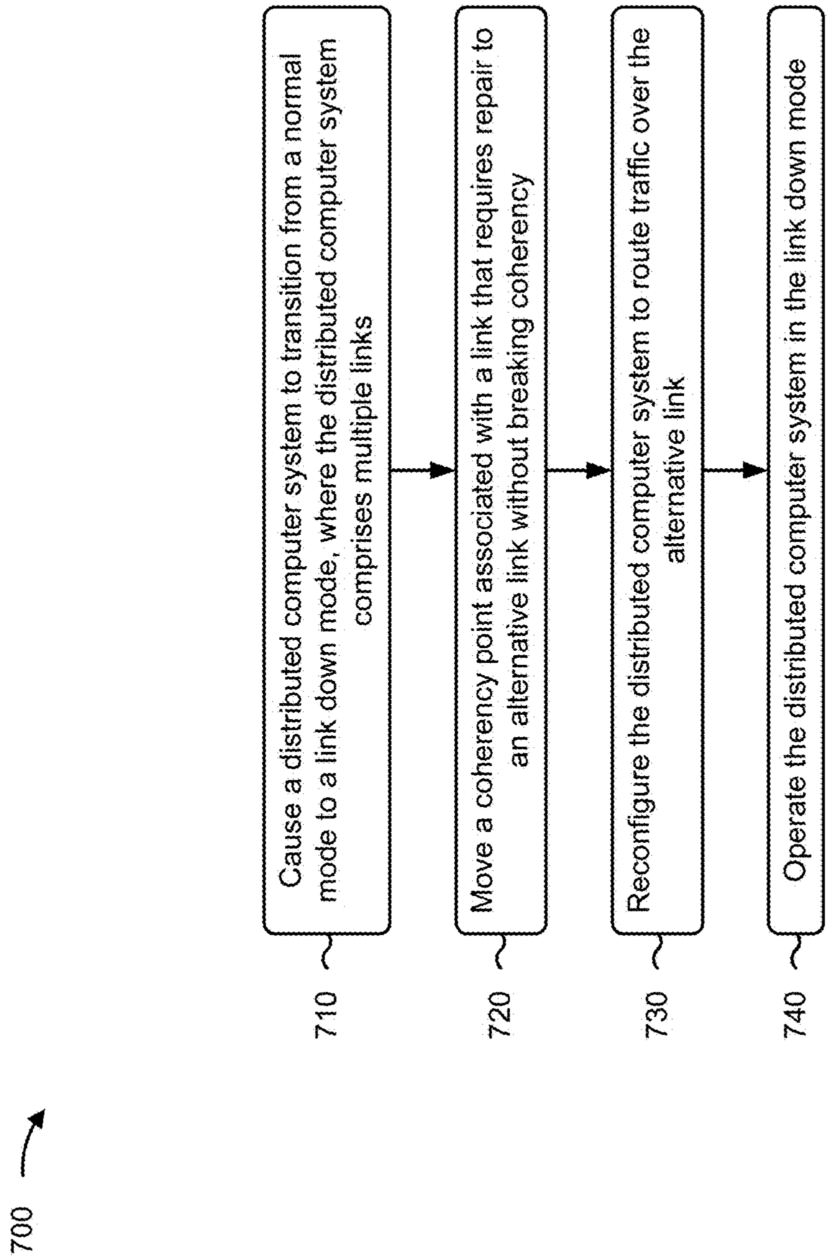
FIG. 7 is a flowchart of an example process associated with moving a coherency point for a link down mode.

FIG. 7 is a flowchart of an example process 700 associated with moving a coherency point for a link down mode. One or more process blocks of FIG. 7 are performed by a computer system (e.g., computer 102) and/or by another device or a group of devices separate from or including the computer system. Additionally, or alternatively, one or more process blocks of FIG. 5 may be performed by one or more components of computer 102, such as processor set 114, communication fabric 116, volatile memory 118, and/or move coherency point code 150.

As shown in FIG. 7, process 700 includes one or more computer-readable storage media (block 710). For example, the computer system may one or more computer-readable storage media, as described above.

As further shown in FIG. 7, process 700 includes program instructions stored on the one or more computer-readable storage media to perform operations comprising: causing a distributed computer system to transition from a normal mode to a link down mode, wherein the distributed computer system comprises multiple links; moving a coherency point associated with a link that requires repair to an alternative link without breaking coherency; reconfiguring the distributed computer system to route traffic over the alternative link; and operating the distributed computer system in the link down mode (block 720). For example, the computer system may program instructions stored on the one or more computer-readable storage media to perform operations comprising: causing a distributed computer system to transition from a normal mode to a link down mode, wherein the distributed computer system comprises multiple links; moving a coherency point associated with a link that requires repair to an alternative link without breaking coherency; reconfiguring the distributed computer system to route traffic over the alternative link; and operating the distributed computer system in the link down mode, as described above.

Process 700 may include additional aspects, such as any single aspect or any combination of aspects described below and/or in connection with one or more other processes described elsewhere herein.

In a first aspect, the program instructions further comprise temporarily quieting the distributed computer system to prevent commands from being interrupted and messages from being lost during the transition to the link down mode.

In a second aspect, alone or in combination with the first aspect, the program instructions further comprise dynamically changing a routing protocol and a coherency protocol in the distributed computer system to accommodate the relocation of the coherency point In a third aspect, alone or in combination with one or more of the first and second aspects, process 700 includes switching the coherency point back to the link after repair, in association with restoring an original coherency protocol and an original routing protocol.

Although FIG. 7 shows example blocks of process 700, in some implementations, process 700 includes additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the implementations to the precise forms disclosed. Modifications may be made in light of the above disclosure or may be acquired from practice of the implementations. For example, various aspects of this disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

A computer program product embodiment ("CPP embodiment" or "CPP") is a term used in this disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer-readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, RAM, ROM, erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc), or any suitable combination of the foregoing. A computer-readable storage medium, as that term is used in this disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors configured to: perform X; perform Y; and perform Z," that claim should be interpreted to mean "one or more processors configured to perform X; one or more (possibly different) processors configured to perform Y; and one or more (also possibly different) processors configured to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method comprising:

quieting a computer system configured for symmetric multiprocessing by blocking traffic that is not associated with a link down protocol for a link;

moving a coherency point from a first chip associated with the link to a second chip associated with an alternative link; and unquieting the computer system to allow the traffic to resume.

2. The method of claim 1, further comprising reconfiguring the computer system to change from a multi-link routing protocol to a reduced-link routing protocol.

3. The method of claim 2, further comprising maintaining the computer system in the reduced-link routing protocol mode without losing functionality.

4. The method of claim 1, further comprising:

quieting the computer system;

moving the coherency point for the link from the second chip back to the first chip in association with a repair of the link; and unquieting the computer system such that the link is able to carry the traffic.

5. The method of claim 4, further comprising reconfiguring the computer system to change to a multi-link routing protocol.

6. The method of claim 1, wherein a command that moves the coherency point uses an original coherency associated with the first chip and an original routing associated with the first chip to complete the command.

7. The method of claim 1, further comprising validating information and directing all other processor cores in the computer system to enter spin loops.

8. A computer system comprising:

a processor set;

one or more computer-readable storage media; and program instructions stored on the one or more computer-readable storage media to cause the processor set to perform operations comprising:

dynamically changing a coherency protocol and routing in the computer system to enter a link down mode;

quieting the computer system to stop commands coming into or out of a chip or unit associated with a first link;

moving a coherency point associated with the first link to an alternative link without breaking coherency;

changing inter-node bus valid signals and inter-node routing; and resuming full capacity and functionality in the link down mode.

9. The computer system of claim 8, wherein the operations further comprise directing a non-coherent address register to move into the link down mode.

10. The computer system of claim 8, wherein the operations further comprise reconfiguring, in association with bringing down the first link, link registers and coherency-related registers to reroute traffic to the alternative link while maintaining coherency.

11. The computer system of claim 8, wherein the dynamically changing of the coherency protocol and the routing comprises dynamically changing the coherency protocol and the routing based on a quantity of links in the computer system.

12. The computer system of claim 8, wherein the changing of the coherency point comprises changing the coherency point for only two nodes connected by the link, without changing the coherency point for other nodes in the computer system.

13. The computer system of claim 8, wherein the operations further comprise:

issuing a command to dynamically change the coherency protocol and the routing, wherein the command is associated with an original coherency and original routing protocols after the coherency protocol and the routing have changed.

14. The computer system of claim 8, wherein the computer system is a single drawer system or a multi-drawer system and the coherency point is moved only for drawers affected by the link.

15. The computer system of claim 8, wherein the coherency point is moved from a first chip on a first drawer to a second chip on a second drawer.

16. The computer system of claim 8, wherein the system is a symmetric multiprocessing system.

17. A computer program product, comprising:

one or more computer-readable storage media; and program instructions stored on the one or more computer-readable storage media to perform operations comprising:

causing a distributed computer system to transition from a normal mode to a link down mode, wherein the distributed computer system comprises multiple links between two sets of chips;

moving a coherency point associated with a link that requires repair to an alternative link without breaking coherency;

reconfiguring the distributed computer system to route traffic over the alternative link; and operating the distributed computer system in the link down mode.

18. The computer program product of claim 17, wherein the operations further comprise:

temporarily quieting the distributed computer system to prevent commands from being interrupted and messages from being lost during the transition to the link down mode.

19. The computer program product of claim 17, wherein the operations further comprise:

dynamically changing a routing protocol and a coherency protocol in the distributed computer system to accommodate relocation of the coherency point.

20. The computer program product of claim 17, wherein the operations further comprise:

switching the coherency point back to the link after repair, in association with restoring an original coherency protocol and an original routing protocol.

* * * * *